July 7, 1953          J. M. DORTON          2,644,505

AUTOMOBILE SEAT STRUCTURE

Filed Oct. 18, 1950          3 Sheets-Sheet 1

INVENTOR.
John M. Dorton
BY Hamilton + Hamilton
Attorneys.

July 7, 1953      J. M. DORTON      2,644,505
AUTOMOBILE SEAT STRUCTURE
Filed Oct. 18, 1950      3 Sheets-Sheet 2
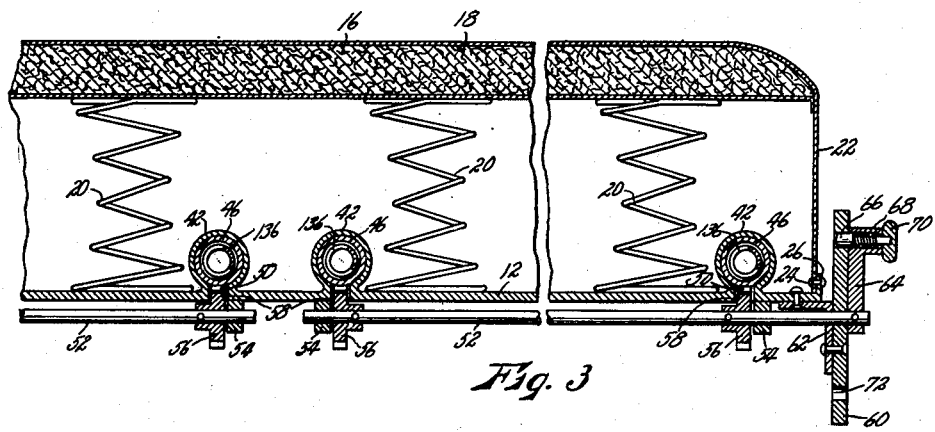
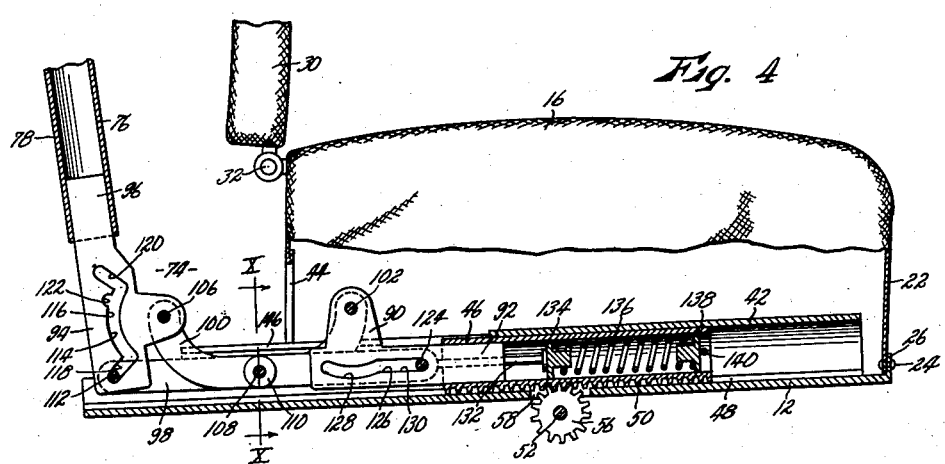
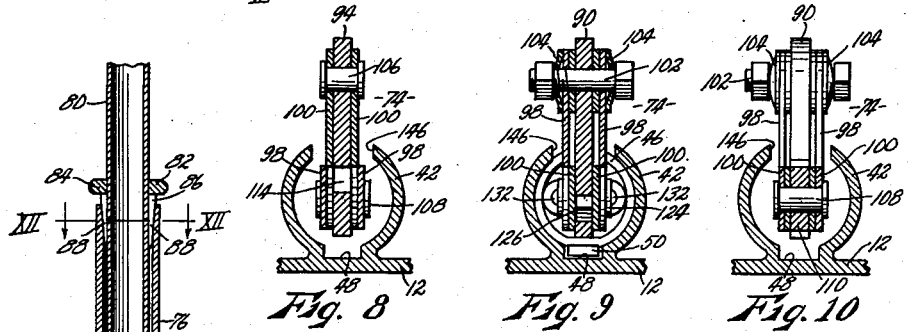
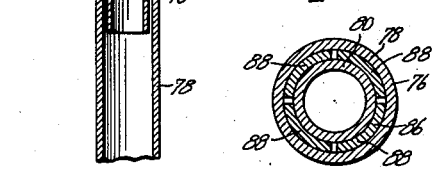
INVENTOR.
John M. Dorton
BY
Hamilton + Hamilton
Attorneys.

July 7, 1953  J. M. DORTON  2,644,505
AUTOMOBILE SEAT STRUCTURE
Filed Oct. 18, 1950  3 Sheets-Sheet 3

INVENTOR.
John M. Dorton
BY
Hamilton + Hamilton
Attorneys.

Patented July 7, 1953

2,644,505

UNITED STATES PATENT OFFICE 2,644,505

AUTOMOBILE SEAT STRUCTURE

John M. Dorton, Bonner Springs, Kans.

Application October 18, 1950, Serial No. 190,719

19 Claims. (Cl. 155—7)

1

This invention relates to new and useful improvements in automobile seat structures, and relates particularly to a seat structure adjustable to form a bed.

The principal object of the present invention is the provision, in an automobile seat arrangement consisting of front and rear seat structures arranged in the usual manner, of a front seat structure the back cushion of which is adapted to be pivotally lowered into substantially a common plane with the seat cushions of said front and rear seat structures, and to extend therebetween, thereby forming a bed.

Another object is the provision, in a front seat structure of the character described, of a novel disposition of the pivotal connection between the back and seat cushions, whereby although said back cushion is of normal height when in its upright position, it may be lowered to form a bed when the distance between the front and rear seat structures is substantially less than the upright height of said back cushion.

A further object is the provision, in a front seat structure of the class described, of means for adjusting the height of the back cushion, in order that when said back cushion is lowered to form a bed, it may be adjusted to bridge accurately the space between the front and rear seat structures.

A still further object is the provision of a front seat structure of the class described having a resilient back cushion, rigid means for supporting said back cushion at its upper edge, said back cushion being secured pivotally at its lower edge to said seat cushion, and said back cushion supporting means being pivotally associated with the seat base. This permits the pivotal connection of the back and seat cushions to "float" and provides that the back cushion will move up and down with the seat cushion as the latter is compressed by the weight of the occupant. This arrangement greatly reduces driving fatigue.

A still further object is the provision, in a front seat structure of the class described above, of a novel hinge connection between the back cushion supporting means and the seat base, said hinge being adapted by simple movement of the back cushion to lock said back cushion either in its upright position, in its horizontal position wherein it forms a bed, or in an intermediate semi-reclining position.

Other objects are simplicity and economy of construction, ease and convenience of operation, the provision of means for adjusting the slope of the back cushion, and adaptability for use in various types of seats.

2

With these objects in view, as well as other objects which will appear in the course of the specification, reference will be had to the drawing, wherein:

Fig. 3 is an enlarged, foreshortened fragmentary section taken on line III—III of Fig. 1.

Fig. 4 is an enlarged, fragmentary section taken on line IV—IV of Fig. 2, with parts left in elevation.

Fig. 8 is an enlarged fragmentary section taken on line VIII—VIII of Fig. 6.

Fig. 9 is an enlarged fragmentary section taken on line IX—IX of Fig. 6.

Fig. 10 is an enlarged fragmentary section taken on line X—X of Fig. 4.

Fig. 11 is an enlarged fragmentary section taken on line XI—XI of Fig. 1.

Fig. 12 is an enlarged section taken on line XII—XII of Fig. 11.

Figure 1:
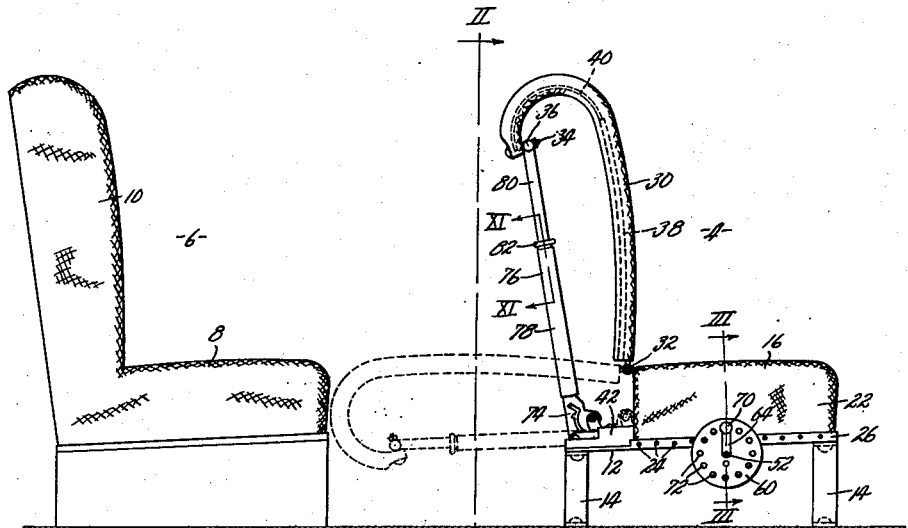
Fig. 1 is a side elevation of the seat arrangement of an automobile, the front seat of which embodies the present invention, showing the back cushion thereof in its normal or upright positions in solid lines, and lowered to form a bed in dotted lines.
Figure 2:
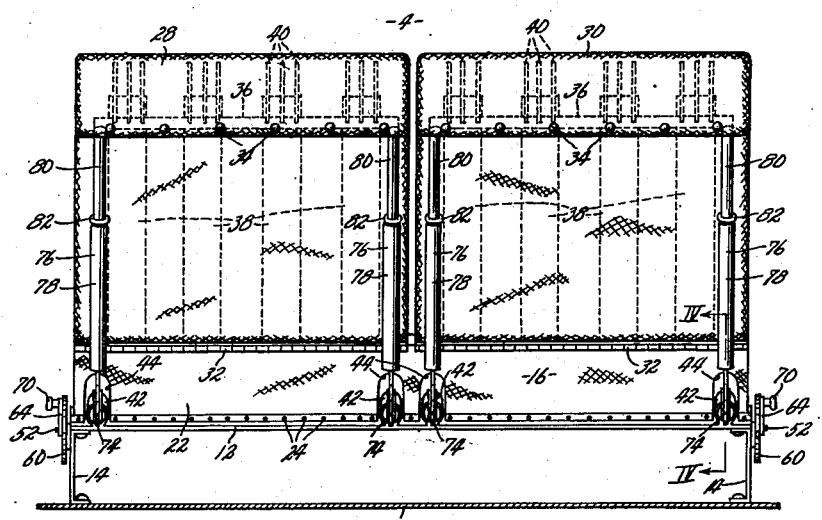
Fig. 2 is a sectional view taken on line II—II of Fig. 1, constituting a rear elevational view of the front seat structure.

Like numerals apply to similar parts throughout the several views, and the numeral 2 applies to the floor of an automobile, on which are mounted a front seat structure 4 and a rear seat structure 6; said front and rear seat structures being disposed in the usual relationship, being parallel and with the seat cushions thereof at substantially the same elevation above the floor. The rear seat structure comprises a seat cushion 8 and a back cushion 10. It may be of standard construction and is not here detailed.

The front seat structure is carried on a base plate 12 which is supported above floor 2 by means of legs 14. Said base plate is substantially rectangular, and extends approximately the full width of the automobile. The front seat cushion 16 is unitary, extending the full width of base plate 12, and from the forward edge of said base plate to a point spaced forwardly from the rearward edge of said base plate. The only essential feature of the seat cushion, as concerns this invention, is that it be resiliently compressible. As best shown in Fig. 3, it comprises an upholstery pad 18 supported yieldably above base plate 12 by means of a plurality of coil springs 20 interposed therebetween. The pliable sheet covering 22 of said cushion is turned downwardly around the sides of the cushion and secured by fasteners such as rivets 24 to an upstanding flange 26 formed on base plate 12.

The back cushion of the front seat structure is divided into two like sections 28 and 30, each having a width substantially one-half that of seat cushion 16. Said sections are independently adjustable to a horizontal position as hereinafter described, whereby to form a bed of either half or full width. Each of said back cushions is relatively thin. Although the precise thickness is a matter of choice, one and one-half inches is suggested as an example.

Each section is pivotally secured at its lower edge to the upper rearward edge of seat cushion 16 by means of a suitable hinge 32, and extends upwardly therefrom. The upper edge portion of each section is turned rearwardly and downwardly, and is secured at its edge by fasteners such as bolts 34 to a horizontal, transversely extending cross bar 36. Said cross bars form a part of a supporting structure hereinafter fully described. Back cushions 28 and 30 are resilient, having relatively stiff resilient struts 38 therein extending upwardly from hinge 32 to the point where said cushions break rearwardly, and relatively flexible resilient members such as wires 40 fixed to the upper ends of struts 38 and extending around the rearwardly curved portion of the cushions to the edge thereof.

Rigidly fixed to the upper surface of base plate adjacent each edge of each back cushion is a tubular guide 42 extending from the rearward edge of said base plate to a point adjacent the forward edge thereof. Apertures 44 are formed in upholstery covering 22 of seat cushion 16 at the rearward side of said cushion, through which said guides extend. The pair of guides associated with each back cushion are parallel, and at right angles to the hinge 32 of said back cushion. A tubular slide 46 is carried for longitudinal sliding movement in each of guides 42. Each of said slides is formed to present a toothed rack 50 along the lower edge thereof and extending the full length thereof. Guide tube 42 has a slot 48 formed along the lower edge thereof for accommodating said rack. Said slot extends the full length of said guide tube, and said guide tube is welded or otherwise fixed to base plate 12 at either side of said slot, as best shown in Figs. 8, 9, and 10.

Slides 46 associated with each back cushion are movable in guides 42 by a mechanism best shown in Figs. 3 and 4, and including a horizontal shaft 52 extending transversely to guide tubes 42 beneath base plate 12. There are two such shafts, coaxially disposed and each extending beneath the pair of guide tubes associated with each back cushion. Said shafts are carried for rotation in bearings 54 fixed to the under side of base plate 12. Two pinions 56 are fixed on each shaft 52, said pinions extending upwardly through holes 58 formed in base plate 12 and meshing respectively with the racks 50 of the slides 46 carried in the associated guide tubes. At its outer end, each shaft 52 passes centrally through a circular index plate 60 fixed to base plate 12 by means of bracket 62, and a crank 64 is fixed to said shaft adjacent the outer surface of said index plate. As shown in Fig. 3, said crank carries at its free end a detent pin 66 normally urged toward index plate 60 by a spring 68 disposed about said detent pin and manually retractable from said index plate by means of handle 70. Said detent pin is adapted to enter selectively any of a plurality of holes 72 in the index plate concentrically around shaft 52. It is apparent that by manually retracting the detent 66, crank 64 may be turned and will operate through shaft 52, pinion 56, and rack 50 to move slides 46 forwardly or rearwardly. When the detent is released, it will enter one of holes 72 to secure the slides in any desired position.

Connected to the rearward end of each slide 46 by means of a hinge structure 74, which will be later described in detail, is a telescoping support rod 76. As shown in Figs. 1 and 4, said support rods normally extend upwardly from the rearward edge of base plate 12 in spaced relation behind back cushions 28 and 30. Each support rod comprises a tube 78 attached at its lower end to hinge structure 74 and a tube 80 fixed at its upper end to the cross bar 36 of the associated back cushion and having its lower end portion disposed slidably in tube 78. The degree of extension of support rods 76 may be set by means of locking devices 82 each comprising, as best shown in Figs. 11 and 12, a collar 84 disposed slidably about tube 80 just above tube 78 and a longitudinally tapered circular skirt 86 depending from said collar and adapted to enter the annular space between tubes 78 and 80. Said skirt is longitudinally split to form segmental fingers 88 which are adapted to be forced inwardly by the wedging action of tube 78 to grip tube 80 frictionally, thereby securing said tubes against relative longitudinal movement.

Figure 5:
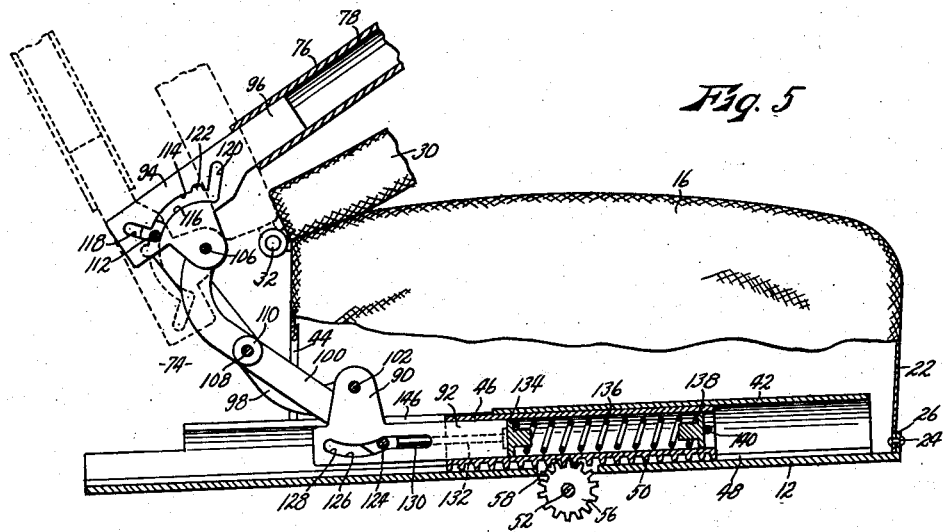
Fig. 5 is a view similar to Fig. 4, showing the back structure pivoted forwardly in solid lines, and pivoted rearwardly preparatory to being lowered to form a bed in dotted lines.
Figure 6:
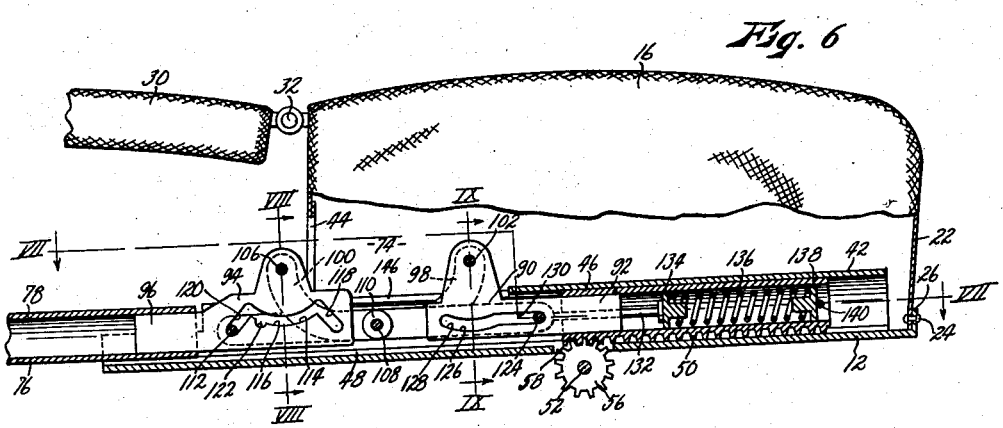
Fig. 6 is a view similar to Fig. 4, showing the back structure lowered to form a bed.

Hinge structure 74, which is detailed in Figs. 4 to 10, includes a plate 90 disposed in the vertical longitudinal plane of slide 46 and having a tongue 92 projecting forwardly into the rearward end portion of slide tube 46 and welded or otherwise rigidly secured therein. Said plate is substantially thinner than the internal diameter of said slide tube. A second plate 94, lying in the same plane as plate 90, is provided with a tongue 96 extending into the lower end of tube 78 and rigidly secured therein. Plates 90 and 94 are connected by a pair of links 98 and 100. Each of said links is double comprising two planar members disposed respectively at opposite sides of plates 90 and 94, as best shown in Figs. 7 to 10. Each of said links is substantially L-shaped, the shorter leg of link 98 being pivotally secured to plate 90 by means of bolt 102 at a point spaced above guide tube 46. Bolt 102 carries friction washers 104 bearing against link 98 for a purpose hereinafter appearing. The longer arm of link 98 is normally disposed coaxially with slide 46 and guide tube 42, as shown in Figs. 4 and 6, and extends rearwardly from bolt 102.

The shorter leg of link 100 is pivotally secured to plate 94 by means of pivot pin 106 at a point spaced transversely from the axis of tube 78 equally with the spacing of bolt 102 from the axis of slide 46. The longer leg of link 100 is also normally disposed coaxially with slide 46, as shown in Figs. 4 and 6 and extends forwardly. Links 98 and 100 are pivotally joined intermediate plates 94 and 100 by pivot pin 108, a spacer washer 110 being carried on said pin to compensate for the thickness of said plates.

Link 98 extends rearwardly beyond pivot pin 106, and is pivotally joined at its rearward end to plate 94 by means of pivot pin 112, said pin extends through a slot 114 formed in said plate, and is adapted to move transversely through said slot. Slot 114 comprises an arcuate section 116 concentric with pivot pin 106, and radial sections 118 and 120 extending outwardly from the respective ends of said arcuate section. One or more notches 122 may be formed in the wall of arcuate section 116 opposite pivot pin 106 and intermediate the radial sections 118 and 120, in order to permit semi-reclining positions of the back cushions as hereinafter described. Link 100 extends forwardly of bolt 102, and is pivotally secured at its forward edge to plate 90 by means of pivot pin 124, said pin extending through a slot 126 formed in said plate and adapted to move transversely through said slot. Said slot has an arcuate section 128 concentric with bolt 102 and a straight section 130 extending forwardly substantially coaxially with slide 46. Pivot pins 106, 108, 112, and 124, and bolt 102, are parallel with each other, and with the cushion hinges 32.

A pair of rods 132 are pivotally connected at their rearward ends to pivot pin 124, respectively at opposite sides of plate 90, and extend forwardly therefrom into the rearward end of slide tube 46, bearing at their forward ends against a disc 134 carried movably in said slide tube. A helical compression spring 136 is disposed within the slide tube, bearing at one end against disc 134 and at its opposite end against a disc 138 disposed at the forward end of the slide tube and secured therein by a pin 140, extending diametrically across said tube.

Figure 7:
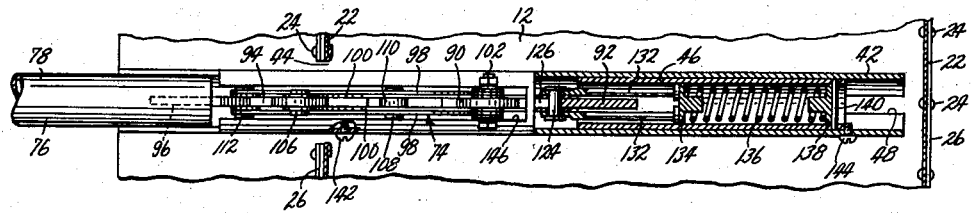
Fig. 7 is a fragmentary section taken on line VII—VII of Fig. 6.

The operation of the seat structure is as follows: The normal or driving position of the seat is shown in solid lines in Fig. 1, and Fig. 4. In this position, it is apparent that the inclination of either or both back cushions may be adjusted to the user's taste by turning cranks 64 as above described to move slides 46 forwardly or rearwardly. Said slides are prevented from overrunning pinions 56 by a pair of set screws 142 and 144 fixed in the side wall of each guide tube 42 as shown in Fig. 7. Said set screws project into the path of slide tube 46, thereby limiting the movement thereof. With set screw 142 removed, the slides may be pulled outwardly from the rearward ends of the guide tubes. It is apparent also that the height of the back cushions may be adjusted by loosening locking members 82 and sliding tubes 80 upwardly or downwardly in tubes 78. The disposition of struts 38 and wires 40 in the back cushions provides that the flexing of said back cushions caused by this adjustment will be confined largely to the rearwardly and downwardly curved portions thereof.

Also, due to the vertical yieldability of the back cushion, and to the fact that the back cushions are connected to the seat cushion by floating hinges 32, it is apparent that the back cushions will move with the seat cushion when the latter is compressed by the weight of the occupant. This eliminates the friction between the back cushion and the occupant's back which would otherwise occur during the continuous jostling of driving, and has been found to contribute greatly to driving comfort and the reduction of driving fatigue. While this feature is not in itself new, being shown in applicant's prior patents and applications, a main objective of this invention is the adaptation of this type of seat to form a bed.

When it is desired to pivot either back cushion downwardly to either a semi-reclining or a horizontal position, the back cushion is first pivoted forwardly to the position shown in solid lines in Fig. 5. Guide tube 42 has a slot 146 formed in the upper edge thereof to permit the upward movement of the hinge structure. During this movement, pivot pin 124 moves through straight section 130 of slot 126, and is thereby moved relatively closer to bolt 102. This causes a relative scissoring action between links 98 and 100 about pivot pin 108, thereby moving pivot pin 112 through radial section 118 of slot 114 into the arcuate section 116 of said slot. The links and slots are so proportioned that pivot pin 112 enters arcuate slot section 116 at the same time pivot pin 124 reaches the rearward end of straight slot section 130. Any further forward motion of the seat back will not cause any further relative movement of links 98 and 100, since pivot 124 then moves through arcuate slot section 128 which is concentric with bolt 102. Springs 136, acting through rods 132, assist the forward movement of the seat backs. Said springs are not, however, so powerful as to pivot the backs forwardly without assistance. As pivot pin 124 reaches the rearward end of straight slot section 130, disc 134 abuts against the forward end of tongue 92, thereby removing any spring action from the hinge structure. This tends to hold the hinge links substantially stationary while the support rods 76 are pivoted rearwardly about pivot pin 106 to the position shown in dotted lines in Fig. 5. The friction washers 104 loading pivot 102 also tend to hold the hinge links stationary while support rods 76 are pivoted at 106.

As the support rods 76 are pivoted rearwardly slots 114 are moved over pivot pin 112 until said pin lies at the entry to radial portions 120 of said slots. The back cushion is then pushed downwardly to the position shown in Fig. 6 and in dotted lines in Fig. 1. During this movement, the travel of pivot pin 124 through straight slot section 130, causes a relative scissoring action of links 98 and 100 about pivot 108, which moves pivot pin 112 outwardly into radial slot section 120. As said pin abuts the outer end of slot 120, pivot pin 124 abuts the forward end of slot 130, and the hinge is locked against further downward movement. Springs 136 cushion the downward movement of the seat backs. If it is desired to set the back at a semi-reclining position, support rods 76 are pivoted at 106 until pivot pin 112 lies opposite notch 122 of slot 114. A downward pressure on the seat back substantially parallel to support rods 76 will then cause pivot pin 112 to be moved outwardly to engage notch 122, thereby locking the back at an intermediate position.

Hinging the back cushions to the seat cushion substantially at the line of intersection of the surfaces thereof, a feature made possible by the thinness of the back cushion, provides that when the back is lowered, its rearward projection behind the front seat structure will be less than the normal extension of the back above the seat; thereby assisting in forming a bed in automobiles having only a limited space between the front and rear seat structures. It is usual in modern automobiles that the front seat back is of greater height than the distance from the back of the front seat to the front of the back seat. In the present structure, moreover, the rearward extension of the front seat back structure may be adjusted either by telescoping the support rods 76, or by moving slides 46 forwardly or rearwardly. When the back cushion is lowered to form a bed, these two adjustments supplement each other, and may be combined either to increase or decrease the rearward extension of the back cushion, thereby accurately to bridge the distance to the forward edge of the back seat structure.

While I have shown a specific embodiment of my invention, it is apparent that many minor changes of structure and operation could be made without departing from the spirit of the invention, and it is therefore desired that my protection extend to all subject matter falling properly within the scope of the appended claims.

What I claim is:

1. An adjustable seat structure comprising a base, a resiliently compressible seat cushion mounted on said base, support members secured at their lower ends to said base and extending upwardly therefrom, a resilient back cushion hinged at its lower edge to the upper rearward edge of said seat cushion and extending upwardly therefrom, the upper edge portion of said back cushion being curved rearwardly and downwardly and secured to the upper ends of said support members, and means for adjustably moving said support members forwardly and rearwardly on said base, whereby to adjust the angle of inclination of said back cushion.

2. An adjustable seat structure comprising a base, a resiliently compressible seat cushion mounted on said base, support members secured at their lower ends to said base and extending upwardly therefrom, a resilient back cushion hinged at its lower edge to the upper rearward edge of said seat cushion and extending upwardly therefrom, the upper edge portion of said back cushion being curved rearwardly and downwardly and secured to the upper ends of said support members, and means for adjusting the height of said support members whereby to adjust the height of said back cushion.

3. An adjustable seat structure comprising a base, a resiliently compressible seat cushion mounted on said base, support members secured at their lower ends to said base and extending upwardly therefrom, a resilient back cushion hinged at its lower edge to the upper rearward edge of said seat cushion and extending upwardly therefrom, the upper edge portion of said back cushion being curved rearwardly and downwardly and secured to the upper ends of said support members, means for adjustably moving said support members forwardly and rearwardly on said base whereby to adjust the angle of inclination of said back cushion, and means for adjusting the height of said support members whereby to adjust the height of said back cushion.

4. An adjustable seat structure comprising a base, a resiliently compressible seat cushion mounted on said base, support members carried pivotally at their lower ends by said base and adjustable from a substantially upright position to a substantially horizontal position, and a resilient back cushion hinged at its lower edge to the upper rearward edge of said seat cushion, the upper edge portion of said back cushion being curved rearwardly and downwardly and secured to the upper ends of said support members.

5. An adjustable seat structure comprising a base, a resiliently compressible seat cushion mounted on said base, support members carried pivotally at their lower ends by said base and adjustable from a substantially upright position to a substantially horizontal position, a resilient back cushion hinged at its lower edge to the upper rearward edge of said seat cushion, the upper edge portion of said back cushion being curved rearwardly and downwardly and secured to the upper ends of said support members, and means for adjustably moving said support members forwardly and rearwardly with respect to said base.

6. An adjustable seat structure comprising a base, a resiliently compressible seat cushion mounted on said base, support members carried pivotally at their lower ends by said base and adjustable from a substantially upright position to a substantially horizontal position, a resilient back cushion hinged at its lower edge to the upper rearward edge of said seat cushion, the upper edge portion of said back cushion being curved rearwardly and downwardly and secured to the upper ends of said support members, and means for adjustably varying the length of said support members.

7. An adjustable seat structure comprising a base, a resiliently compressible seat cushion mounted on said base, support members carried pivotally at their lower ends by said base and adjustable from a substantially upright position to a substantially horizontal position, a resilient back cushion hinged at its lower edge to the upper rearward edge of said seat cushion, the upper edge portion of said back cushion being curved rearwardly and downwardly and secured to the upper ends of said support members, means for adjustably moving said support members forwardly and rearwardly on said base, and means for adjustably varying the length of said support members.

8. An adjustable seat structure comprising a base, a resiliently compressible seat cushion mounted on said base, a resilient back cushion hinged at its lower edge to said seat cushion and normally extending upwardly therefrom, the upper edge portion of said back cushion being curved rearwardly and downwardly, a guide member secured to said base, a slide member carried for forward and rearward movement by said guide member, means for adjustably fixing said slide at any desired position in its movement, and a support member hingeably secured at one end to said slide and at its opposite end to the upper edge of said back cushion, said support member being adapted by said hingeable connection to be moved from a normally substantially upright position to a substantially horizontal position wherein said back cushion is disposed in substantially coplanar relation with said seat cushion.

9. An adjustable seat structure comprising a planar base, a resiliently compressible seat cushion mounted on said base, a pair of resilient back cushions each hinged at its lower edge to the upper rearward edge of said seat cushion, the upper edge portions of said back cushions being curved rearwardly and downwardly, a guide member mounted on said base adjacent each transverse edge of each of said seat cushions, a slide carried for forward and rearward movement by each of said guide members, means for releasably fixing each of said slides at any desired position in its movement, a support rod hingeably secured at its lower end to the rearward end of each of said slides rearwardly from said seat cushion and adjustable from a substantially upright to a substantially horizontal position, and a cross bar extending between and fixed to the free ends of the two support rods associated with each of said seat cushions, the upper edge of said back cushion being secured to said cross bar.

10. An adjustable seat structure comprising a planar base, a resiliently compressible seat cushion mounted on said base, a pair of resilient back cushions each hinged at its lower edge to the upper rearward edge of said seat cushion, the upper edge portions of said back cushions being curved rearwardly and downwardly, a guide member mounted on said base adjacent each transverse edge of each of said seat cushions, a slide carried for forward and rearward movement by each of said guide members, a rack carried by each of said slides, a pair of shafts carried for rotation by said base transversely to the movement of said slides, each of said shafts transversing the two slides associated with one of said seat cushions, a pair of pinions fixed to each of said shafts and meshing respectively with the racks of the associated slides, means releasably securing each of said shafts against rotation, a support rod hingeably secured at its lower end to the rearward end of each of said slides rearwardly from said seat cushion and adjustable from a substantially upright to a substantially horizontal position, and a cross bar extending between and fixed to the free ends of the two support rods associated with each of said back cushions, the upper edge of said seat cushion being secured to said cross bar.

11. An adjustable seat structure comprising a planar base, a resiliently compressible seat cushion mounted on said base, a pair of resilient back cushions each hinged at its lower edge to the upper rearward edge of said seat cushion, the upper edge portions of said back cushions being curved rearwardly and downwardly, a guide member mounted on said base adjacent each transverse edge of each of said seat cushions, a slide carried for forward and rearward movement by each of said guide members, means releasably fixing each of said slides at any desired position in its movement, a longitudinally extensible support rod hingeably secured at its lower end to the rearward end of each of said slides rearwardly from said seat cushion and adjustable from a substantially upright to a substantially horizontal position, means releasably locking said support rods at any desired degree of extension, and a cross bar extending between and fixed to the free ends of the two support rods associated with each of said seat cushions, the upper edge of said back cushion being secured to said cross bar.

12. An adjustable seat structure comprising a planar base, a resiliently compressible seat cushion mounted on said base, a pair of resilient back cushions each hinged at its lower edge to the upper rearward edge of said seat cushion, the upper edge portions of said back cushions being curved rearwardly and downwardly, a guide member mounted on said base adjacent each transverse edge of each of said seat cushions, a slide carried for forward and rearward movement by each of said guide members, a rack carried by each of said slides, a pair of shafts carried for rotation by said base transversely to the movement of said slides, each of said shafts transversing the two slides associated with one of said seat cushions, a pair of pinions fixed to each of said shafts and meshing respectively with the racks of the associated slides, means for releasably securing each of said shafts against rotation, a longitudinally extensible support rod hingeably secured at its lower end to the rearward end of each of said slides rearwardly from said seat cushion and adjustable from a substantially upright to a substantially horizontal position, means for releasably locking said support rods at any desired degree of extension, and a cross bar extending between and fixed to the free ends of the two support rods associated with each of said seat cushions, the upper edge of said back cushion being secured to said cross bar.

13. In an adjustable seat structure of the class described, a seat assembly, a back assembly, and a hinge structure joining said back assembly to said seat assembly for pivotal movement on a horizontal transverse axis, said hinge structure comprising a first plate fixedly associated with said seat assembly, a second plate fixedly associated with said back assembly, said plates being disposed in a vertical plane transverse to the hinge axis and each having a slot formed therethrough, a first link pivotally secured at one end to said first plate at a point above the horizontal midplane of the hinge and extending rearwardly therefrom, a second link pivotally secured to said second plate at a point above the horizontal midplane of the hinge and extending forwardly therefrom, a pivotal connection between said links intermediate their ends, a first pin fixed in the rearward end of said first link and extending through the slot of said second plate, said slot having an arcuate portion concentric with the pivotal connection of said second link to said second plate and radial portions extending outwardly from each end of said arcuate portion, and a second pin secured in the end of said second link and extending through the slot of said first plate, said slot being disposed parallel to the horizontal midplane of the hinge, said pins being disposed at greater distances from the pivotal connection between said links than the pivotal connections of said links to said plates.

14. In an adjustable seat structure of the class described, a seat assembly, a back assembly, and a hinge structure joining said back assembly to said seat assembly for pivotal movement on a horizontal transverse axis, said hinge structure comprising a first plate fixedly associated with said seat assembly, a second plate fixedly associated with said back assembly, said plates being disposed in a vertical plane transverse to the hinge axis and each having a slot formed therethrough, a first link pivotally secured at one end to said first plate at a point above the horizontal midplane of the hinge and extending rearwardly therefrom, a second link pivotally secured to said second plate at a point above the horizontal midplane of the hinge and extending forwardly therefrom, a pivotal connection between said links intermediate their ends, a first pin fixed in the rearward end of said first link and extending through the slot of said second plate, said slot having an arcuate portion concentric with the pivotal connection of said second link to said second plate and radial portions extending outwardly from each end of said arcuate portion, and a second pin secured in the end of said second link and extending through the slot of said first plate, said slot being disposed parallel to the horizontal midplane of the hinge, said pins being disposed at greater distances from the pivotal connection between said links than the pivotal connections of said links to said plates, whereby as said back assembly is pivoted forwardly, the movement of said second pin in the slot of said first plates causes a relative pivotal movement of said links to move said first pin out of a radial portion into the arcuate portion of the slot of said second plate, whereby said back assembly may then be pivoted about the pivotal connection of said second link with said second plate to bring the other radial portion of said slot opposite said first pin, and whereby rearward pivotal movement of said back assembly will cause said first pin to enter said radial slot portion, said rearward movement being limited by the engagement of said pins with the end walls of their respective slots, and the radial portions of the slot in said second plate being so disposed that the back assembly may be positioned either substantially upright or substantially horizontal.

15. The device as set forth in claim 14 having resilient means carried by said seat assembly and adapted to exert a rearward pressure on said second pin, whereby to assist in the forward pivotal movement of said back assembly and to cushion the rearward pivotal movement of said back assembly.

16. The device as set forth in claim 14 having a spring carried by said seat assembly and urging said second pin rearwardly, and an abutment carried by said seat assembly and adapted to arrest the action of said spring as said first pin enters the arcuate portion of the slot in said second plate.

17. The device as set forth in claim 14 having frictional means for loading the pivotal connection of said first link to said first plate, whereby said connection is rendered stiffer than the pivotal connection of said second link to said second plate.

18. The device as set forth in claim 14 having a spring carried by said seat assembly and urging said second pin rearwardly, an abutment carried by said seat assembly and adapted to arrest the action of said spring as said first pin enters the arcuate portion of the slot of said second plate, and frictional means for stiffening the pivotal connection of said first link to said first plate.

19. The device as set forth in claim 14 wherein the slot in said second plate is provided with a radially extending portion intermediate the end radial portions thereof, whereby said back assembly may be positioned at a semi-reclining angle intermediate the upright and horizontal positions thereof.

JOHN M. DORTON.

References Cited in the file of this patent

UNITED STATES PATENTS

| Number | Name | Date |
|---|---|---|
| 1,390,177 | Taylor | Sept. 6, 1921 |
| 1,548,334 | Sebell | Aug. 4, 1925 |
| 1,677,434 | Dorton | July 17, 1928 |
| 2,324,902 | Benzick et al. | July 20, 1943 |

FOREIGN PATENTS

| Number | Country | Date |
|---|---|---|
| 682,808 | France | Feb. 18, 1930 |
| 717,556 | France | Oct. 20, 1931 |